United States Patent [19]

Okada et al.

[11] Patent Number: 4,800,726
[45] Date of Patent: * Jan. 31, 1989

[54] TURBO COMPOUND ENGINE

[75] Inventors: Masaki Okada; Keiji Kishishita, both of Kawasaki, Japan

[73] Assignee: Isuzu Motors Limited, Tokyo, Japan

[*] Notice: The portion of the term of this patent subsequent to Jun. 7, 2005 has been disclaimed.

[21] Appl. No.: 136,319

[22] Filed: Dec. 22, 1987

[30] Foreign Application Priority Data

Dec. 26, 1986 [JP] Japan .................. 61-308776

[51] Int. Cl.⁴ .............................. F02G 5/00
[52] U.S. Cl. ........................ 60/614; 60/624
[58] Field of Search .................. 60/602, 614, 624

[56] References Cited

U.S. PATENT DOCUMENTS 2,375,852  5/1945  Kilchenmann .................. 60/624 X
4,224,794  9/1980  Woollenweber .................. 60/602

FOREIGN PATENT DOCUMENTS 962764  4/1957  Fed. Rep. of Germany ........ 60/624
61921   3/1986  Japan ........................ 60/624
56341   12/1986 Japan ........................ 60/624

Primary Examiner—Michael Koczo
Attorney, Agent, or Firm—Cullen, Sloman, Cantor, Grauer, Scott & Rutherford

[57] ABSTRACT

A turbo compound engine including driving power transmission means for drivingly connecting a crankshaft of the engine to a power turbine provided in an exhaust gas passage, so as to secure an adequate braking force, which is relatively weakened by an improvement in engine performance, by activating a power turbine by means of the driving power transmission means during exhaust braking, thereby transforming the work of the power turbine to braking force of the crankshaft in order to increase the entire braking force of the engine.

8 Claims, 4 Drawing Sheets

TURBO COMPOUND ENGINE

BACKGROUND OF INVENTION

1. Technical Field

The present invention relates to a turbo compound engine that is capable of recovering the energy of exhaust gas and utilizing the recovered energy as rotative power for a drive shaft such as a crank shaft or the like. In particular, it concerns a turbo compound engine that is capable of developing an engine brake force that is at least equal to that of a non-supercharged engine of equal power output.

2. Background Art

Generally, supercharged engines feature, in comparison with non-supercharged engines of larger displacements: (1) better fuel economy, (2) output performance that is at least equal to non-supercharged engines, and (3) lighter weight and compactness.

These advantages of supercharged engines are further augmented in highly supercharged engines and in turbo compound engines, and this invention is especially concerned with the latter.

In the turbo compound engine, the energy of exhaust gas from the engine is reocvered by the turbocharger as its supercharging work, and the remaining energy of the exhaust gas from the turbocharger is recovered by the power turbine as its adiabatic expansion work. Although this construction brings about a general improvement in the power output performance, fuel economy, and gain of the engine, the expansion ratios of the turbocharger and the power turbine must be increased in order to raise its supercharging pressure so that the turbo compound engine's overall performance can be further improved.

However, it remains a problem to secure an engine brake (exhaust brake) to counterbalance the increased power output of the engine. This may be seen in the relationships existing among engine revolution speed Ne, engine output power Pme, and engine brake force Pmf, shown in FIG. 6 of the accompanying drawings for a highly turbocharged engine in comparison with a non-supercharged engine. In this figure, the solid line indicates the output power performance, and the dotted line represents engine brake force. Specifically, with regard to the relative braking force (i.e., engine revolution speed/engine output power) at the 100% rated revolution speed $N_{100}$, $B_N/S_N > B_T/S_T$, where $B_N$ stands for the engine brake force of a non-supercharged engine, $S_N$ for the engine output power of the non-supercharged engine, $B_T$ for the engine brake force of a highly supercharged engine, and $S_T$ for the engine output power of the highly supercharged engine. This means that the relative engine brake force suffers a decrease when the supercharging is intensified, so that a main brake (i.e., foot brake) should be manipulated in order to offset the relative decrease of the entire braking force.

To reiterate, obtaining a sufficiently large engine brake force is important not only for the maneuverability and safety of the vehicle (engine brake force of approximately more than 60% of the rated output power is required), but also for taking better advantage of the advantages of the turbo compound engine. In connection with the above description, the present assignee has proposed a "Turbo Compound Engine" disclosed in Japanese Patent Application No. 61-228107 and U.S. Patent Application Ser. No. 091,161, filed Aug. 31, 1987.

In this proposal, as shown in FIG. 7, a power turbine which recovers the exhaust gas energy is provided in the exhaust gas passage b1, and another passage c which bypasses the turbine a is provided which is branched from b1 upstream of the turbine a, whereby to define a segment b2. An exhaust gas passage switching means e is provided so as to close the upstream side passage b2 when the exhaust brake is operating and driving power is transmitted to the turbine a from the crankshaft d.

The exhaust gas passage switching means e is comprised of a rotary valve which has two internal ports with large and small diameters in a manner such that the passage b1 and another passage c are connected to each other by the port of small diameter when the exhaust brake is functioning.

Upon exhaust-braking by the exhaust passage switching means, the exhaust gas line b1 upstream of the by-pass line c is closed, and the upstream, side b2 of the power turbine a is connected with the bypass line c with the exhaust gas being throttled by the exhaust gas passage switching means e, so that the rotation of the crankshaft d is reversed by a gear train h and the rotative power is transmitted to the power turbine a, which is originally intended to recover the energy. In this manner, the power turbine a will perform negative work against the crankshaft, i.e., pumping work, since the exhaust gas downstream of the power turbine a comes through the bypass line c, as shown by the dotted arrow in FIG. 7. Therefore, during exhaustbraking, an engine brake force of considerable magnitude, that is to say, motor friction of the engine, pumping work (negative work), and the exhaust brake force, can be generated.

However, the exhaust brake may function, even when the engine is running above the rated revolution speed, i.e., when the engine is in an overrun condition, for example, in the case of driving down a slope under a light load-high revolution speed condition. In this case, there is a substantial possibility that the power turbine may also go into an overrun condition, which should be avoided. The present inventors have found that the overrun is a factor causing significant deterioration of rotation performance of the rotating portion of the power turbine as well as the bearing portion, and thus devised the present invention.

SUMMARY OF THE INVENTION

One object of this invention is to provide a turbo compound engine whereby when a power turbine is driven to rotate by a crankshaft so as to transmit to the crankshaft a braking force relative to the power turbine rotation, even at the rated speed of the engine, the power turbine will not reach excessive rotative speed, so that a stable and reliable braking force is produced by the power turbine.

Another object of this invention is to provide a turbo compound engine in which, by preventing the power turbine from rotating beyond its over-rotative speed, a sudden braking force will not be applied to the crankshaft, and an undue load will not be added to the driving power transmission system, so that the durability and reliability of the driving force transmission system will be improved.

A further object of this invention is to provide a turbo compound engine in which, by rotating the power turbine below its overrotative speed, a certain rotation performance is maintained with the power turbine, as well as the rotative portion and the bearing portion which support the driving force transmission system.

These objects are achieved by a turbo compound engine compressing an engine which has an exhaust gas passage and a crankshaft, a power turbine provided in the exhaust gas passage for recovering the exhaust gas energy, a driving power transmission means for drivingly connecting the crankshaft and the power turbine, a fluid passage connected to a portion of the exhaust passage between the power turbine and the engine, and fluid passage switching means for closing the exhaust passage upstream of the fluid passage while opening the fluid passage during exhaust braking.

DETAILED DESCRIPTION OF THE PREFERRED EMBODIMENTS

A preferred embodiment of the turbo compound engine according to the present invention will now be described with reference to the accompanying drawings.

Figure 1:
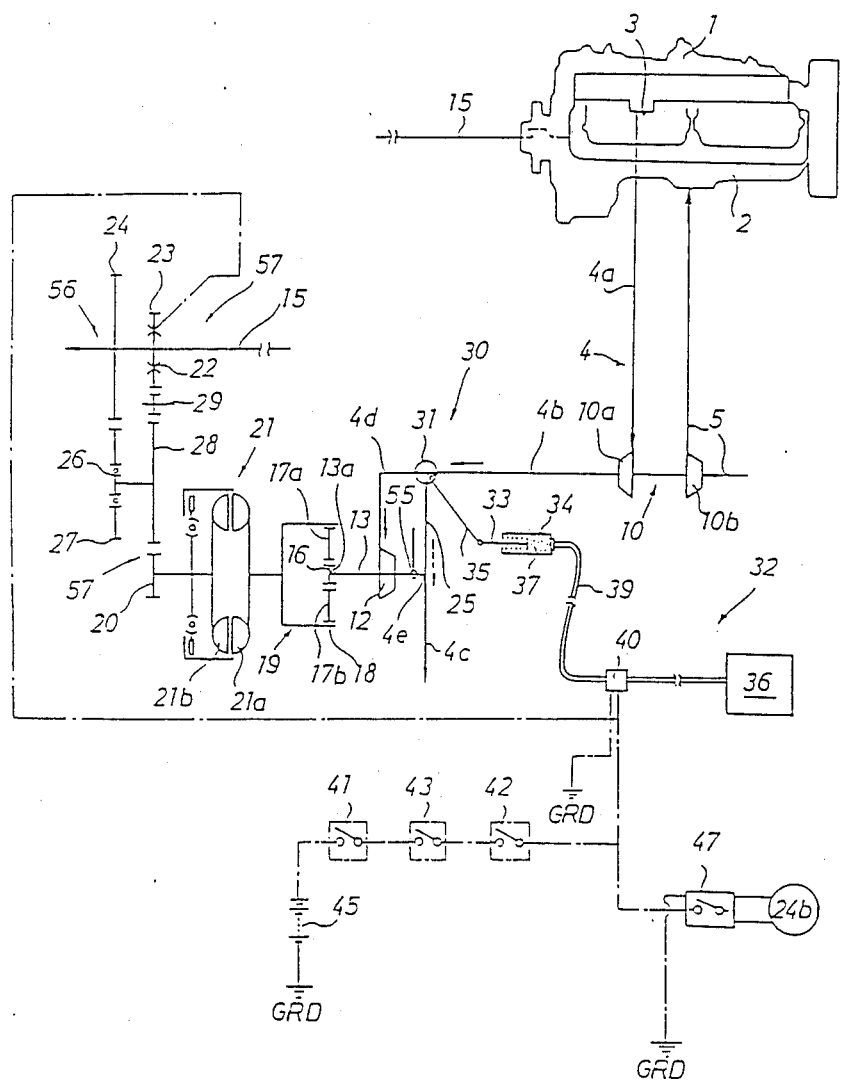
FIG. 1 is a system diagram, showing a preferred embodiment of the turbo compound engine of the present invention.

In FIG. 1, the numeral 1 designates an engine, 2 the intake manifold, and 3 the exhaust manifold. To the exhaust manifold 3, there is connected an exhaust gas passage 4 consisting of portions 4a–4d, while the intake manifold 2 is connected to an intake air passage 5.

The turbine 10a of the turbocharger 10 is disposed at an intermediate point in exhaust passage 4a, while the compressor 10b of the turbocharger 10 is disposed at an intermediate point in the intake passage 5. In the exhaust passage 4b downstream of the turbocharger 10, there is disposed a power turbine 12.

To repeat, one object of this invention is to realize a turbo compound engine which is capable of securing an adequate engine brake force relative to the engine output performance. In this embodiment, in order to increase the engine brake force, it has been found that a resistance force applied to the rotative crankshaft 15 directly or indirectly is effective in loading the crankshaft 15 with considerable negative work.

As shown in FIG. 1, a bypass line 25 is connected to the exhaust gas passage 4b between the power turbine 12 and the turbine 10a of the turbo charger 10 at one end, and at the other end to the passage 4c downstream of the power turbine 12. At the junction of the bypass line 25 upstream of the power turbine 12, there is provided an exhaust gas passage switching means 30.

Figure 2:
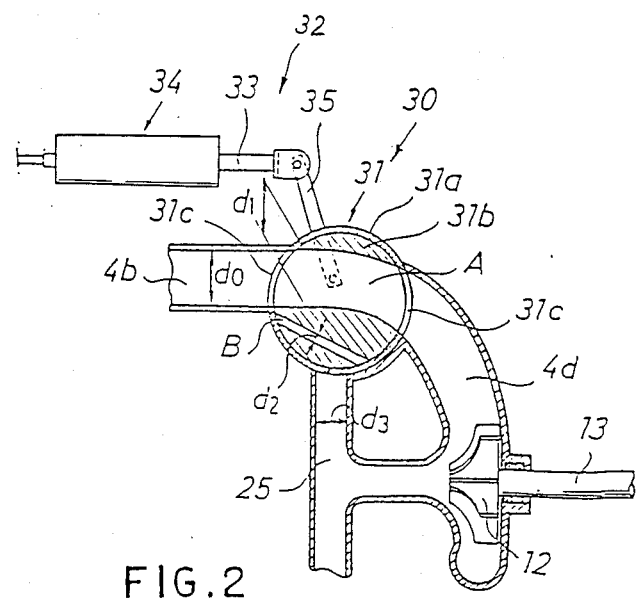
FIGS. 2 and 3 are enlarged views of a portion of FIG. 1, showing the switching positions of the rotary valve, the rotary valve having a first port of large diameter and a second port of small diameter and being disposed at the junction of the bypass passage and the exhaust gas passage.
Figure 3:
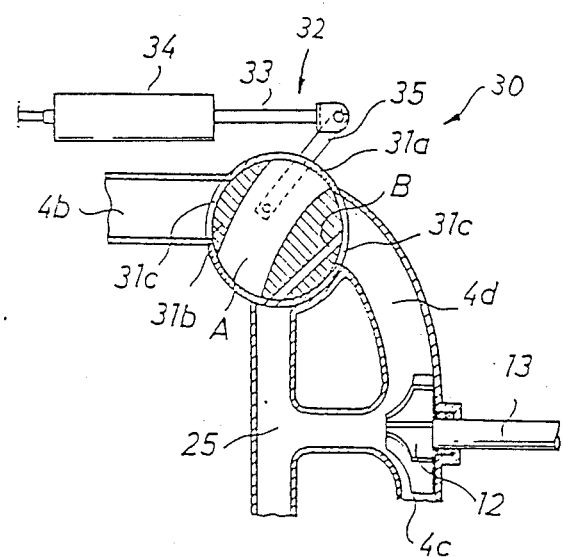

In this embodiment, the fluid passage switching means 30 comprises, as shown in FIGS. 1 to 3, a rotary valve 31, which is disposed in the above-mentioned junction and functions as an exhaust gas switching valve, and a driving mechanism 32 therefor. The rotary valve 31 comprises, as shown in FIGS. 2 and 3, a rotor 31b, which is rotatably disposed in the casing 31a, a first port A, and a second port B, the two ports being formed within the rotor 31b in a manner such that the diameter of the first port A, d1, is equal to that of the exhaust passage 4b, d0, while the diameter of the second port B, d2, is smaller than that of the passage 25,d3. In the casing 31a, two openings 31c are provided for the exhaust passage 4b, and the fluid passage 25, in a way such that when the first port A is rotated into a position connecting the exhaust passage 4b, the second port B will be rotated away to disconnect the exhaust passage 4b and the fluid passage 25 as shown in FIG. 2.

The driving mechanism 32 that drives and controls the rotary valve 31 is constructed as follows. Namely, as shown in FIGS. 1 and 2, to the rotor 31b there is connected one end of a lever member 35, while to the other free end thereof, namely that end which extends out of the exhaust passage 4b in the radial direction, there is connected the actuating rod 33 of the actuator 34.

Now, referring to FIG. 1, the fluid chamber 37 of the actuator 34 is connected to a fluid feeding apparatus 36 via a fluid passage 39, and midway in the fluid passage 39, there is disposed an electromagnetic valve 40 in a manner such that it connects the fluid chamber 37 and the fluid feeding apparatus 36 when activated by electric current from a DC power source 45, such as a battery. It is to be noted that the electromagnetic valve 40 is activated only when the neutrality sensing switch 41 that senses neutrality of the engine 1, the clutch action switch 42, and the exhaust brake switch 43 are all turned ON.

The numeral 47 denotes a switch for the reverse rotation of the electromagnetic clutch, which is, during normal operation, kept open.

Next, a gear train for connecting the power turbine 12 and the crankshaft 15 will be explained. As shown in FIG. 1, to the output shaft 13a of the turbine shaft 13 of the power turbine 12, there is integrally provided an output gear 16. Epicyclic gears 17a and 17b are engaged with the output gear 16. These epicyclic gears 17a and 17b are engaged with a ring gear 18 which rotates with an input pump 21a of the fluid coupling 21.

The output gear 16 is connected to the fluid coupling 21 via the epicyclic gearing 19 which comprises the planetary gears 17a and 17b as well as the ring or sun gear 18, so that the rotative force from the power turbine 12 can be transmitted to the output pump 21b of the fluid coupling 21. The epicyclic gearing 19 is provided because it has a larger moderating ratio and a high transmission efficiency. To the output pump 21, there is provided a gear 20 which rotates with the pump 21b.

To the crankshaft 15, there are connected a first crankshaft gear 23, which includes an electromagnetic clutch 22 and whose rotation is stopped by the clutch 22, and a second crankshaft gear 24. The second crankshaft gear 24 is engaged with the second intermediate gear 27 which includes a one-way clutch 26. The second intermediate gear 27 is connected to said output gear 20 via a first intermediate gear 28 which has a mutual shaft with gear 27.

The first intermediate gear 28 and first crank shaft 23 are connected to each other by the reverse idle gear 29, and when the electromagnetic clutch 22 is operating, that is to say, when the electromagnetic clutch switch 47 is turned ON, the first crankshaft gear 23 and the first intermediate gear 28 are connected, so that the rotative driving force from the crankshaft 15 will be transmitted to the gear 20. At this time, the second intermediate gear 27 and second crankshaft gear 24 are disconnected from each other due to the one-way clutch 26, so that the rotative force will not be transmitted, with the one-way clutch 26 rotating freely.

A major object of this invention is to provide a turbo compound engine whereby an overrun of the power turbine 12 is avoided when the driving force from the crankshaft 15 is transmitted to the power turbine 12 at the rated revolution speed of the engine. Thus, the gear ratios of first crankshaft gear 28, the idle gear 29, the first intermediate gear 28, and the gear 20 must be determined in a manner such that when the engine runs at its rated revolution speed, power turbine 12 is prevented from overrunning. Specifically, the gear ratio between the gear 20 and the second crankshaft gear 24 is set to be larger than that between first crankshaft gear 23 and the gear 20.

In this particular embodiment, the gear ratio between the first crankshaft gear 23 and the first intermediate gear 27 is smaller than that between the second crankshaft gear 24 and the second intermediate gears 27.

The gear train 56 which transmits the rotative power from the power turbine 12 to the crankshaft 15 comprises the second crankshaft gear 24, one-way clutch 26, the first intermediate gear 28, and the gear 20, while the other gear train 57 which transmits the rotation power from the crankshaft 15 to the power turbine 12 comprises the first crankshaft gear 23, the idle gear 29, the first intermediate gear 28, and the gear 20.

When the power turbine 12 operates in normal mode and the braking force is generated thereupon, i.e., in the case where the reverse gear train 57 is not provided with an engine, it is readily apparent that the entire gear ratio of the gear train 56 should be chosen in a manner such that the power turbine will not reach its over-rotative speed.

When the exhaust brake is operating, on the other hand, the neutrality sensing switch 41, the clutch action switch 42, and the exhaust brake switches 43 are all turned ON, whereby the switch for reversing the electromagnetic clutch 47 is turned ON, and the electromagnetic switch 40 is turned ON, allowing the fluid feeding apparatus 36 to feed the working fluid into the action chamber 37 of the actuator 34, which drives the action rod 33 to act on the rotary valve 31 via the lever member 35 so as to close the exhaust passage 4b, while connecting the exhaust passage 4d that lies downstream of the rotary valve 31 and the bypass line 25 via the second port B.

Figure 5:
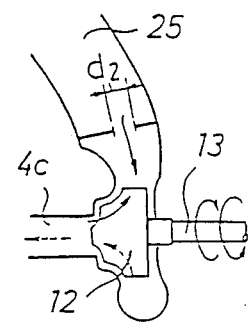
FIG. 5 is a schematic cross-sectional view showing the directions of exhaust.

In this state, therefore, the power turbine 12 is deprived of the rotation driving power of the exhaust gas, whereby the rotation power of the crankshaft 15 is transmitted, in contrast to the case of normal rotation, to the gear 20 and the fluid coupling 21 via the first crankshaft gear 23, the idle gear 29, and the first intermediate gear 28. The power turbine 12 is now operating reversed, as shown in FIG. 5, as a compressor of poor efficiency, blowing air out of the exhaust passage 4c downstream thereof into the junction side of the bypass line 25. Since the gas flowing toward the fluid passage 25 through the second port B is accelerated due to the throttling action of the second port B, a large amount of negative work in the form of the air stirring work and the air compressing work of the power turbine 12 is forced against the crankshaft 15.

Thus, when the exhaust brake is operating, a large engine brake force is created on above-mentioned negative work together with the negative work of the exhaust brake and the motor friction. The exhaust brake means includes an exhaust manifold 3 and an exhaust brake valve (not shown) that is disposed in the exhaust passage 4a such that an increase in the exhaust resistance is brought about when this brake valve is fully closed, namely an increase in the pumping work, acts as the engine brake force.

Figure 4:
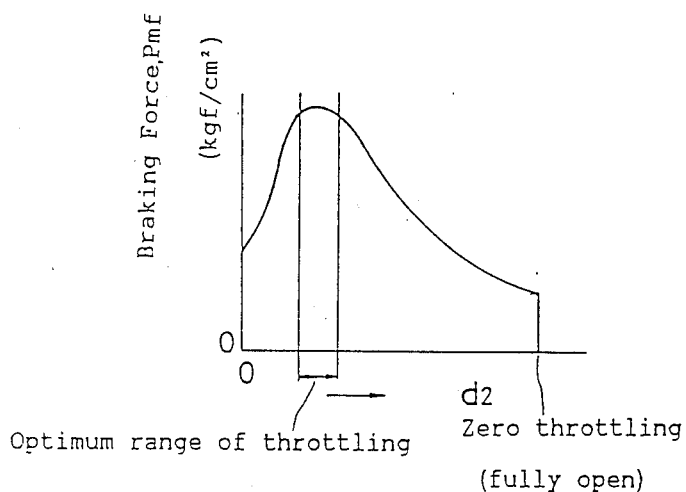
FIG. 4 is a diagram, showing the relationship between an engine brake force and the diameter of the small port.
Figure 6:
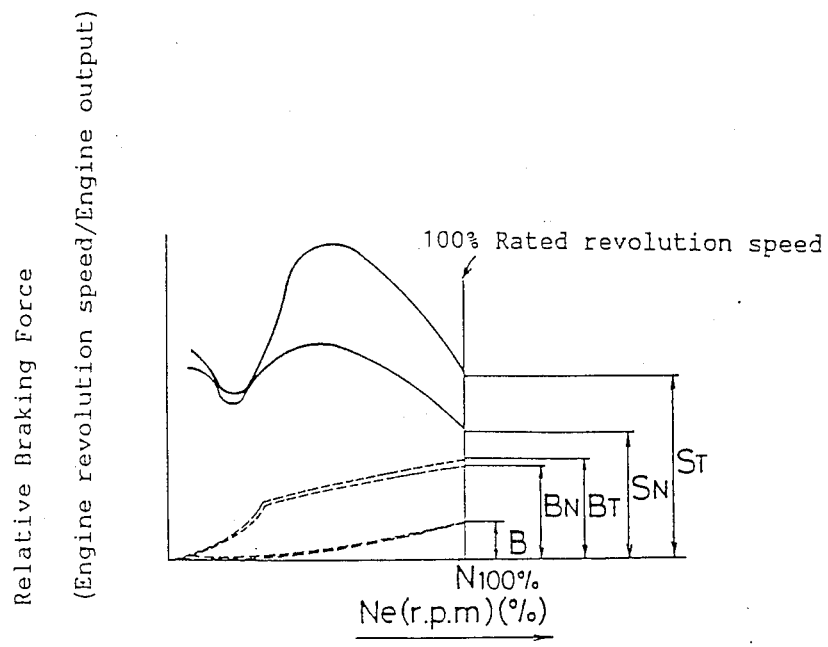
FIG. 6 depicts performance curves, showing the relationship between relative brake force (revolution speed/engine output) and the revolution speed for a non-turbocharged engine and a highly supercharged engine.
Figure 7:
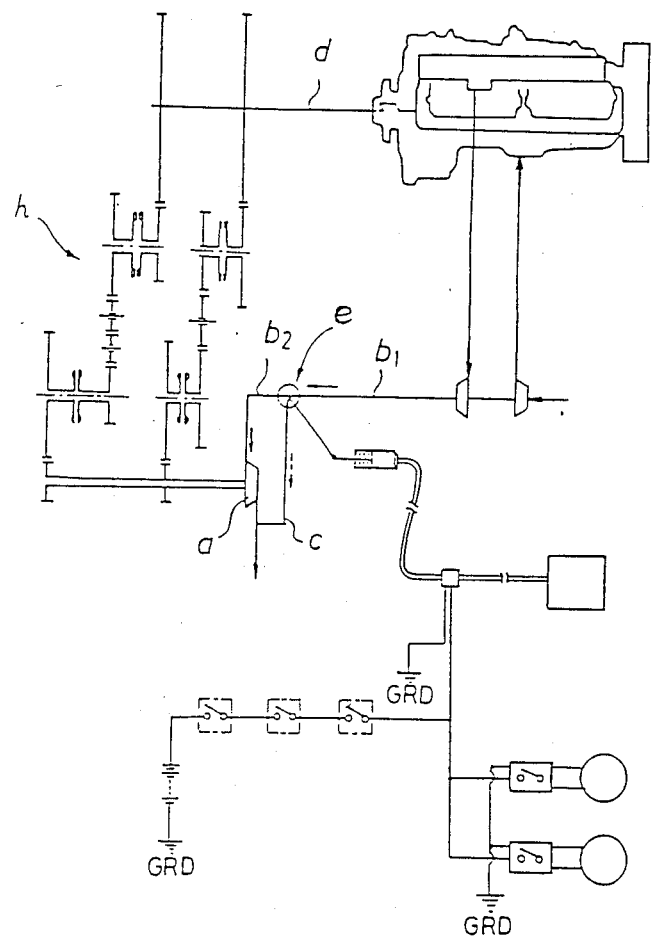
FIG. 7 depicts a system diagram, showing a turbo compound engine of related art.

It is to be noted here that the diameter of the second port B, d2, depends to a large degree on the form of the power turbine 12, i. e., it is determined in a manner such that the overrun of the power turbine 12 will not occur (see FIGS. 4 and 5).

In this embodiment, it is also permissible to provide a three-way valve 55 in the exhaust gas passage 4c between the junction 4e of the passage 4c and the bypass line 25, and the power turbine 12, thereby introducing the air from outside, which may be clearer than the exhaust gas, by closing the passge 4c when the exhaust brake is operating.

In the above-described embodiment, the exhaust gas line 4 and the bypass line 25 are opened/closed or switched by the rotary valve 31; however, the rotary valve is not the only possible form of switching means. Namely, it is acceptable to provide and operate a shutoff valve which fully closes the passage 4b upstream of the bypass line 25 when the reverse rotative power is transmitted to the power turbine 12 from the crankshaft 15 and a throttle valve for controlling the geometric magnitude of the cross-section of the bypass line 25. And, it is also satisfactory if the bypass line 25 is already throttled to a certain degree and then the passage 4b is opened/closed.

What is claimed:

1. A turbo compound engine, comprising:
    an engine having an exhaust gas passage and a crankshaft;
    a power turbine disposed in said exhaust passage so as to recover the exhaust gas energy;
    driving power transmission means for drivingly connecting said power turbine and said crankshaft so as to transmit driving power to said power turbine at a revolution speed below the preselected maximum speed of said power turbine;
    a fluid passage connected to a portion of said exhaust passage which lies between said power turbine and said engine; and
    fluid passage switching means for closing said exhaust passage upstream of said fluid passage while opening said fluid passage during exhaust braking of said engine.

2. The turbo compound engine according to claim 1, wherein said driving power transmission means includes gear train means for connecting said crankshaft and said power turbine, said gear train means including a plurality of gear trains with the gear ratio of each train being set to a value so as to prevent said power turbine from rotating in excess of its preselected maximum speed.

3. The turbo compound engine according to claim 2, wherein said gear train means includes a plurality of gear trains and fluid clutches.

4. The turbo compound engine according to claim 1, wherein one end of said fluid passage is connected to the exhaust passage upstream of said power turbine, and the other end of said fluid passage is connected to the exhaust passage downstream of said power turbine.

5. The turbo compound engine according to claim 1, wherein said driving power transmission means includes reversing gear trains that transmit said driving power from said crankshaft to said power turbine when the exhaust brake is operating, and normal rotation gear trains that transmit said driving power from said power turbine to said crankshaft during normal engine operation, with the gear ratio of said reversing gear trains being smaller than that of said normal rotation gear trains.

6. The turbo compound engine according to claim 5, wherein said driving power transmission means includes fluid clutches and electromagnetic clutches for respectively transmitting said driving power from said normal rotation gear trains and said reversing gear trains.

7. The turbo compound engine according to claim 1, wherein said fluid passage switching means includes a switching valve for closing said exhaust passage upstream of said fluid passage while opening said fluid passage to a predetermined aperture when the exhaust brake is operating and the driving power is transmitted from said crankshaft to said power turbine, said fluid passage switching means further including a driving mechanism for driving said switching valve.

8. The turbo compound engine according to claim 7, wherein said switching valve includes a rotary valve having a first port whose diameter is equal to that of said exhaust passage, and a second port whose diameter is smaller than that of said fluid passage, said switching valve being constructed so as to be activated by said driving mechanism in order to connect said second port to said fluid passage, thereby disconnecting said first port from said exhaust passage when the exhaust brake operates and the driving power is being transmitted from said crankshaft to said power turbine.

* * * * *